Oct. 17, 1933.  E. M. CARVER  1,931,055
SHAFT BEARING
Filed March 16, 1932
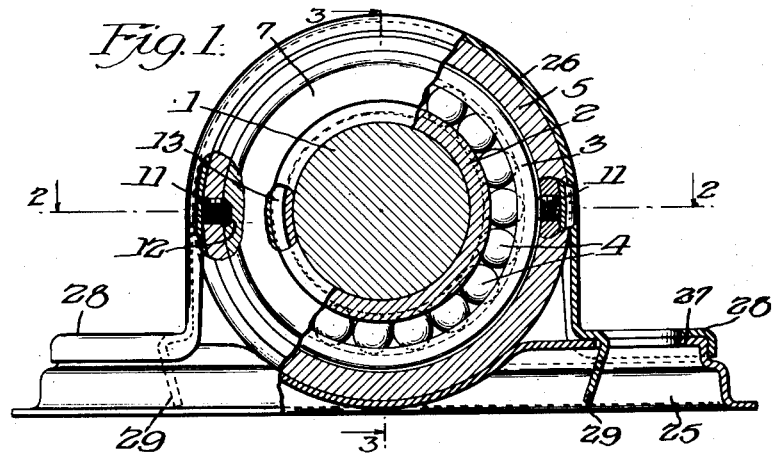
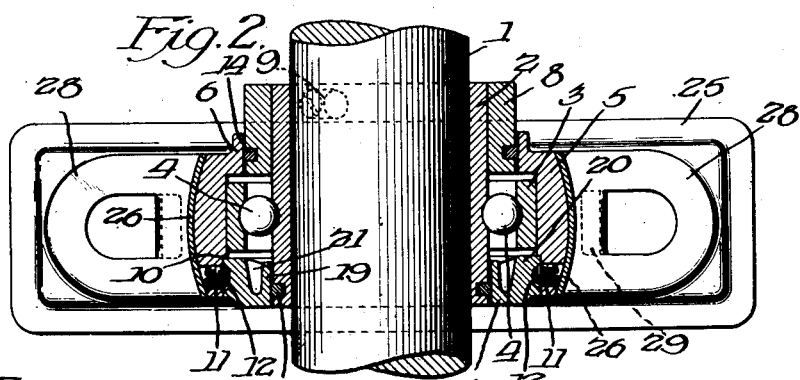
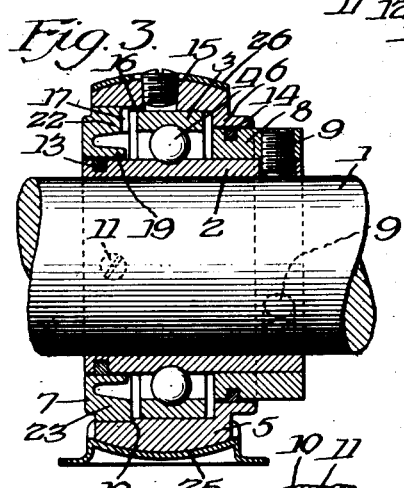
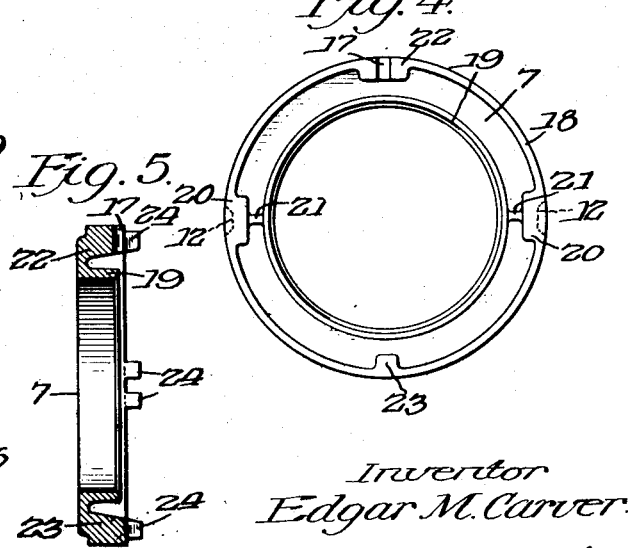
Inventor
Edgar M. Carver Patented Oct. 17, 1933

1,931,055

UNITED STATES PATENT OFFICE 1,931,055

SHAFT BEARING

Edgar M. Carver, South Bend, Ind., assignor to Dodge Manufacturing Corporation, Mishawaka, Ind., a corporation of Delaware Application March 16, 1932. Serial No. 599,083

14 Claims. (Cl. 308—236)

This invention relates to shaft bearings and aims to provide an improved construction for pillow blocks and hanger bearings of the antifriction bearing type.

More particularly the invention has reference to the type of bearing construction in which an antifriction bearing unit is mounted in a recessed housing having an undivided annular wall, the housing being appropriately sealed and the assembled bearing structure being applicable to a shaft without disassembly. A principal object of the invention is to provide a practical, simple and efficient construction of such type. Another object is to provide a compact construction advantageous for small ball bearing practice. Other objects include the provision of improvements in connection with the mounting of the bearing on the shaft, and with reference to the housing closure and sealing means. A further object is to provide an improved outer housing and supporting structure for the housing part which contains the antifriction bearing unit.

The objects and advantages of the invention will more fully appear from the following description with reference to one illustrative embodiment of the invention shown in the accompanying drawing. The construction shown is designed for pillow blocks employing small or moderate sizes of ball-bearing units; though it will be understood that the invention is not restricted in its application to small ball-bearing practice.

In the drawing:

Fig. 1 is a front end view of the illustrative bearing structure, with parts broken away and with other parts in section for clearer illustration.

Fig. 2 is a horizontal section taken at the axis of the shaft, on the line 2—2 of Fig. 1 looking in the direction of the arrows, and showing in elevation the supporting base portion of the outer housing structure.

Fig. 3 is a vertical section taken longitudinally of the shaft axis, on the line 3—3 of Fig. 1 looking in the direction of the arrows.

Fig. 4 is an inner face view of the removable annular closure plate of the housing member in which the ball-bearing unit is mounted.

Fig. 5 is a cross section of a closure plate identical with that previously shown except for the addition of certain spacing lugs cast on the closure plate; this slightly modified form of closure plate being intended for a bearing structure of the non-expanding type as distinguished from the expanding type of construction shown in the preceding figures.

Fig. 6 is a detail sectional view showing one of the fastenings for the closure plate.

It will be understood that the following description with reference to the specific embodiment of the invention herein selected for illustration is not to be taken as limiting the invention otherwise than as defined by the claims appended to the description.

In the drawing, 1 denotes a shaft on which is directly mounted a ball-bearing unit comprising the inner and outer bearing rings 2 and 3 and interposed annular row of balls 4 engaging the confronting grooves or races of said rings. This unit is mounted in a housing 5 having a circular recess to receive the unit and having the rear housing wall 6 and a removable front closure plate 7. The inner bearing ring 2 is elongated to extend through the housing and provide a wide support on the shaft. The forward end of said elongated inner bearing ring extends into the central opening of the annular closure plate 7, while the rearwardly extended portion of said ring projects through and beyond the back of the housing and in this instance has fitted thereon a collar 8 whose forward portion is loosely fitted in the central opening of the rear housing wall 6.

Said elongated inner bearing ring 2 is fastened to the shaft behind the housing by one or more set-screws 9 which in this instance are screwed through tapped holes in the collar 8 and pass through registering untapped holes in the rear end portion of said elongated inner bearing ring.

A rigid clamping of the inner bearing ring to the shaft is desired, in order to prevent any independent movement of the inner bearing ring either rotatively or longitudinally relative to the shaft. This clamping may be effected in an excellent manner by means of the collar 8 in conjunction with either a single set screw 9 or a pair of such set screws arranged at an angle of substantially less than 180° apart. The tightening of such set screw means against the shaft draws the collar laterally towards the shaft, in a direction opposite the force or resultant of forces applied by the set screw means, thereby clamping the rear extension of the inner bearing ring between the shaft and collar. The use of two set screws arranged as stated distributes the clamping action and provides a more effective fastening, with less distortion of the collar, than would be obtainable with the use of a single set screw. The most reliable clamping action with least distortion of the parts results from the use of two set screws arranged with their radial centers at an angle of 120° apart.

As the collar 8 is of unhardened metal, the frictional engagement between the threads of the set-screws 9 and the corresponding threads in the holes of the collar will tend to secure the screws from working loose. Moreover, by employing said collar as the holding means for engagement by the set-screws, a greater extent of engagement is obtainable than would be otherwise possible. Were the collar omitted, the holes in the the rear end portion of the hardened steel inner bearing ring would have to be tapped or threaded holes for engagement with the threads of the set-screws, and in that case the set-screws would have to be short enough to be screwed down flush with the outer surface of the ring 2, while on account of the blunt-pointed ends of the set-screws the actual lengths thereof in engagement with the ring 2 would be materially less than even the short lengths of the set-screws. With the collar 8, even if it be only of the same thickness as the inner bearing ring, a greater extent of screw-threaded engagement with the set-screws is obtained, since the longer screws employed in this instance are in threaded engagement with the collar clear to the inner surface of the collar. Moreover the collar may without excessive expense be made somewhat thicker than the hardened steel inner bearing ring, so that a longer and more effective holding engagement with the screws is thus obtainable, in addition to the advantage of having the screws engaged in a relatively soft metal part.

The housing 5 has the removable front closure plate fitted therein. This annular front closure plate 7 is shown as of somewhat greater diameter than the bore of housing in which the outer bearing ring 3 is fitted, the housing being rabbet-ted to receive said closure plate which is fitted therein against the shoulder 10. By means of set-screws 11 screwed through tapped holes therefor in the housing and having conical inner ends exerting wedging action against beveled walls of sockets 12 in the perimeter of the closure plate, the closure plate is forced tightly against said shoulder 10.

The inner bearing ring 2 and collar 8 rotate with the shaft, and suitable grease seals are provided between these rotating parts and the encircling parts of the stationary housing, that is between the forward end portion of the inner bearing ring and the inner periphery of the closure plate 7 and between the collar 8 and inner periphery of the rear housing wall 6. Exceedingly efficient grease seals are provided by metal expansion rings 13 and 14 of the piston-ring type, loosely fitted in grooves therefor in the revolving parts 2 and 8 and expanding against the surrounding stationary parts 7 and 6. As these sealing rings are loose in their grooves and expanded against the inner peripheries of the surrounding annular parts, they will tend to remain stationary, as is desirable, and the grooved members 2 and 8 will revolve around them. This is advantageous to minimize creeping and to avoid wearing down the rings by friction. As the shaft expands or contracts, the inner bearing ring 2 and collar 8, partaking of the lineal motion due to such expansion or contraction, will push the sealing rings so that they will be in contact at one flat side or the other with the square-grooved members in which they are fitted, but as soon as expanding or contracting motion of the shaft ceases then the natural tendency will be for the rings to center themselves in their grooves, whereupon these rings will be freed from friction and will provide excellent seals of the labyrinth type, preventing escape of grease.

The outer bearing ring 3 is or may be slidable in the bore of the housing 5 to accommodate shaft expansion and contraction. In the top of the housing is an opening for introduction of grease, normally closed by the screw plug 15. Since the outer bearing ring will at all times, regardless of its location, practically cover the hole in which the grease plug 15 is inserted, a grease conduit is provided by cutting a groove 16 in the bore of the housing, this groove communicating with the hole closed by the grease plug and also communicating with a grease conduit or groove 17 in the inner face of the closure plate 7, the latter conduit being provided because of the possibility that the outer bearing ring might assume a position directly against the closure plate.

As shown in Fig. 4, the closure plate 7 is in the form of an annular web having inwardly extending flanges 18 and 19 providing broad outer and inner peripheral portions, and, inasmuch as this closure plate and its securing means should be sufficiently strong to take any reasonable thrust load that may result from the pushing of outer bearing ring against it by shaft expansion, said plate and set-screws have been designed accordingly, with thickened portions 20 and stiffening ribs 21 under the set-screw sockets 12, and the other diametrically opposite thickened portions of the outer flange at 22 and 23, so that this assembly will have a thrust capacity as great as that of the bearing unit itself.

While in the specific construction shown the outer bearing ring may slide in the bore of the housing within the limits permitted by the distance between the front closure plate 9 and the rear housing wall 6, yet in many cases this would not be desired, and therefore the manufacturer of this bearing structure, as of any other, should be able to furnish it either as an expanding or non-expanding type, or be able to provide means whereby to convert the illustrative bearing structure into a non-expanding type, i. e., one in which there would be no capacity for sliding movement or play of the outer bearing ring in the housing. Therefore, it is proposed for a non-expanding type of bearing structure to provide the closure plate 7 with inwardly extending lugs cast on, as indicated at 24 in Fig. 5, these lugs being designed to hold the outer bearing ring against the closed end or rear wall 6 of the housing, and being of sufficient number and size to withstand the thrust load, but so placed as not to interfere with the effectiveness of the grease conduit; which lugs are to be omitted for a bearing structure of the expanding type as hereinbefore described.

The housing 5 is shown as an annular member mounted in an outer housing composed of the base-member 25 and cap-member 26, the outer surface of the inner housing and the contacting inner surfaces of the outer housing members being spherically shaped, so as to provide a ball and socket mounting for the annular inner housing, permitting universal self-adjustment of the bearing to suit the shaft alinement.

The outer housing parts 25 and 26 are of pressed steel or stamped from thick sheet metal. The base-member 25 is stamped to provide the raised portions 27 at either side of its medial socket portion, in which raised portions are cut bolt openings. The inverted U-shaped cap member 26 has its legs bent to provide the foot portions 28 adapted to fit over said raised portions 27 of the base-member. Bolt openings are also cut in these foot portions, but instead of stamping out the holes the metal is so stamped as to provide spring clips or tongues 29 depending from edges of said bolt openings and bent inwardly as shown in Fig. 1 to engage the edges of the registering bolt openings in the base-member, whereby to hold the cap-member separably to the base-member independently of fastening bolts. However reliance is not placed upon the tongues 29 to hold the assembly together when it is mounted, but as will be apparent the holding down bolts (not shown) will pass through the registering bolt openings in the cap and base-members, serving the double purpose of securing the base 25 of the pillow block to whatever it may be mounted on and, at the same time, securing the two portions of the outer housing together.

It will be seen that the invention provides an exceedingly simple and practicable construction, particularly well adapted for the smaller types of shaft mountings employing antifriction bearing units, though not limited in its application thereto. The structure may be pre-assembled in the factory by inserting the inner-bearing ring having the collar 8 applied thereto through the front end of the inner housing, and then applying and fastening the front closure plate 7, and mounting the inner housing in the outer housing comprising the upper and lower parts 25 and 26 separably connected by the resilient tongues 29, and the inner housing may then be suitably charged with grease, whereupon the assembled structure so charged with grease may be shipped to the factory in which it is to be used and may be installed without disassembly by slipping the inner-bearing ring 2 over the shaft and fastening it in place by tightening the set-screws 9.

It will be understood that the invention is not limited to the specific embodiment shown; that the same may be changed in details of construction and arrangement, and that parts of the invention may be used without the whole. I contemplate use of the novel outer housing and supporting structure for bearings other than of the anti-friction type.

What I claim as my invention, and desire to secure by Letters Patent is:

1. A shaft bearing comprising a housing and an antifriction bearing unit mounted therein, said housing having a front opening large enough to admit the unit and a rear opening smaller than the outer bearing ring of said unit, said unit having an elongated inner bearing ring extending through the housing and projecting behind the same, an annular closure plate between the forwardly extending portion of said ring and the housing, a collar on the rearwardly extending portion of said inner bearing ring and revolving therewith in the rear opening of the housing, and means behind the housing carried by said collar and adapted to cooperate with the shaft to which the bearing is applied for fastening said inner bearing ring to said shaft.

2. A shaft bearing comprising a housing and an antifriction bearing unit mounted therein, said housing having a front opening large enough to admit the unit and a rear opening smaller than the outer bearing ring of said unit, a removable front closure for said housing, the central opening of said closure being smaller than the rear opening in the housing, said antifriction bearing unit having an elongated inner bearing ring extending through the housing and projecting behind the same, a collar fitted on the rearwardly extending portion of said inner bearing ring, the forwardly extending portion of said inner bearing ring being in the central opening of the removable front closure and the forward portion of said collar being in the rear central opening, and setscrew means behind the housing carried by and in threaded engagement with said collar and extending through but not in threaded engagement with the rearwardly projecting portion of said inner bearing ring, said setscrew means adapted to be screwed against the shaft to which the antifriction bearing unit is applied to fasten the inner bearing ring thereto by clamping its rear portion between the shaft and collar.

3. A shaft bearing comprising a housing and an antifriction bearing unit mounted therein, said housing having a front opening large enough to admit the unit and a rear opening smaller than the outer bearing ring of said unit, a removable front closure for said housing, the central opening of said closure being smaller than the rear opening in the housing, said antifriction bearing unit having an elongated inner bearing ring extending through the housing and projecting behind the same, a collar fitted on the rearwardly extending portion of said inner bearing ring, the forwardly extending portion of said inner bearing ring being in the central opening of the removable front closure and the forward portion of said collar being in the rear central opening, grease seals between said forwardly extending portion of said inner bearing ring and the surrounding closure and between the said collar and surrounding rear housing wall, and setscrew means behind the housing carried by and in threaded engagement with said collar and extending through but not in threaded engagement with the rearwardly projecting portion of said inner bearing ring, said setscrew means adapted to be screwed against the shaft to which the antifriction bearing unit is applied to fasten the inner bearing ring thereto by clamping its rear portion between the shaft and collar.

4. A shaft bearing comprising a housing and an antifriction bearing unit mounted therein, said housing having a front opening large enough to admit the unit and a rear opening smaller than the outer bearing ring of said unit, a removable front closure for said housing, the central opening of said closure being smaller than the rear opening in the housing, said antifriction bearing unit having an elongated inner bearing ring extending through the housing and projecting behind the same, said inner bearing ring having a collar thereon loosely fitted in the rear central opening of the housing, grease seals between the forwardly extending portion of the inner bearing ring and the surrounding closure and between said collar and the surrounding rear housing wall, and means behind said housing for fastening the rearwardly projecting end of said inner bearing ring to the shaft to which the bearing is applied.

5. A shaft bearing comprising a housing and an antifriction bearing unit mounted therein, said unit comprising concentric bearing rings and an interposed annular series of antifriction bearing elements, said housing having an undivided annular wall recessed to receive the outer bearing ring, a removable front closure for said housing, said inner bearing ring having a rearward extension passing through and projecting beyond the back of the housing, a collar fitted on said extension, the forward part of the collar being in the rear central opening of the housing, and setscrew means behind the housing carried by and in threaded engagement with said collar and passing through but not in threaded engagement with the rearwardly projecting portion of the inner bearing ring and adapted to be screwed against the shaft to which the bearing is applied for fastening said inner ring thereto, there being means establishing grease seals between the removable closure and rear housing wall and the parts rotating therein.

6. A shaft bearing comprising an annular series of antifriction bearing elements, an inner bearing ring having a raceway engaged by said elements, an outer bearing ring engaged by said elements, a housing in which said outer ring is mounted, said inner bearing ring having an extension which passes through and projects beyond one end of the housing, a collar fitted on said extension, setscrew means outside the housing carried by and in threaded engagement with said collar and passing through but not in threaded engagement with the projecting portion of said inner bearing ring and adapted to be screwed against a shaft to which the inner bearing ring is applied to fasten said inner bearing ring thereto by clamping its projecting portion between the collar and the shaft, said collar closing the rear end of the housing, and a closure for the front end of the housing separable therefrom.

7. In a shaft bearing having a housing and an antifriction bearing unit mounted therein, a removable front closure fitted in the housing, the housing being rabbeted to receive said closure and to provide a shoulder against which the inner face of the closure bears, and setscrews screwed through the housing and bearing against said closure, said setscrews having conical inner ends and said closure having bevelled surfaces wedgingly engaged by said conical ends, said surfaces being arranged so that the radial pressure applied by the set screws is transmitted in a direction to force said closure against said shoulder there being no other engagement between the set screws and closure such as to impede the movement of the closure towards said shoulder.

8. A structure of the character set forth in claim 7 in which the closure comprises a channel-shaped annular plate which with the setscrews is designed to have a thrust capacity as great as the thrust capacity of the bearing itself, said plate being reinforced substantially as described.

9. In a structure of the character described in claim 7, the removable closure plate 7 having the spacing lugs 24 cast thereon for the purpose described.

10. In a shaft bearing having an annular housing and an antifriction bearing unit mounted therein, an outer housing in which said annular housing is mounted, said outer housing comprising a base member and inverted U-shaped cap member stamped from sheet metal, the base member being formed with raised portions having bolt openings and the legs of the cap member being formed with outwardly bent feet engaging said raised portions and having registering bolt openings, said feet having resilient tongues bent downwardly from edges of the bolt openings therein and engaging under corresponding edges of the bolt openings in the raised portions of the base member, thereby separably connecting said members which are further adapted to be positively connected by bolts inserted through the registering openings for attaching the structure to a support.

11. In a shaft bearing having an annular housing and an antifriction bearing unit mounted therein, an outer housing in which said annular housing is mounted, the outer surface of said annular housing and contacting inner surface of said outer housing being spherical to provide a ball seat for the annular housing permitting universal self-adjustment of the bearing to suit the shaft alinement, said outer housing comprising a base member and a separate inverted U-shaped cap member the legs of which are formed with feet engaging the base member, one of said members having resilient means in clasping engagement with the other to separably connect the members, and said feet and base member having registering openings for bolts whereby to positively connect said members and attach the structure to a support.

12. In a shaft bearing having an annular housing and an antifriction bearing unit mounted therein, an outer housing in which said annular housing is mounted, said outer housing comprising separably connected base and cap members one of which is provided with resilient means in clasping engagement with the other to hold said members separably connected, said members having cooperating portions provided with registering openings for bolts whereby positively to connect said members together and to a support for the structure.

13. A supporting and housing structure for a shaft bearing comprising a base member and inverted U-shaped cap member stamped from sheet metal, the base member being formed with raised portions having bolt openings and the legs of the cap member being formed with outwardly bent feet engaging said raised portions and having registering bolt openings, said feet having resilient tongues bent downwardly from edges of the bolt openings therein and engaging under corresponding edges of the bolt openings in the raised portions of the base member, thereby separably connecting said members which are further adapted to be positively connected by bolts inserted through the registering openings for attaching the structure to a support.

14. A supporting and housing structure for a shaft bearing comprising separably connected base and cap members one of which is provided with resilient means in clasping engagement with the other to hold said members separably connected, said members having cooperating portions provided with registering openings for bolts whereby positively to connect said members together and to a support for the structure.

EDGAR M. CARVER.